Oct. 8, 1968 G. S. TARBOX 3,405,261
SIGHT GLASS ILLUMINATOR
Filed July 11, 1966

INVENTOR.
George S. Tarbox
BY
Peck & Peck
ATTORNEYS

United States Patent Office 3,405,261
Patented Oct. 8, 1968

3,405,261
SIGHT GLASS ILLUMINATOR
George S. Tarbox, Yonkers, N.Y., assignor to Jacoby-Tarbox Corporation, Yonkers, N.Y., a corporation of New York
Filed July 11, 1966, Ser. No. 564,095
5 Claims. (Cl. 240—2)

This invention relates broadly to the art of illuminating sight glasses, and in its more specific aspects it relates to such illuminating means which is readily adaptable to sight glasses of all types and sizes as are conventionally used in pressurized or non-pressurized fluid flow lines, tanks, processing equipment, and the like; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

Sight glasses are usually installed in fluid flow lines, tanks, processing equipment, and the like, and in many areas where such sight glasses may be installed the flow of the fluid through and within the sight glass is not always visible to the eye, and since this is the major purpose of the sight glass, or flow indicator, it will be readily recognized that some sort of illuminating means for the sight glass is highly desirable and advantageous.

One of the problems, from among many, which has heretofore been encountered in the development of a simple, economical and readily installed illuminator for sight glasses, is that there are many different types and sizes of sight glasses, and hence prior to my invention, as far as I am aware, there has been no single unit illuminator assembly, which is easily adaptable and useable with such various types and sizes of sight glasses. In other words, one of my illuminator units may be used on substantially all types and sizes of sight glasses.

It has been one of my major purposes to devise an illuminator which is easily and simply adaptable and useable on all types and sizes of conventional sight glasses, and in so doing I have eliminated the necessity of providing a plurality of different elements for assembly in order to provide an illuminator adaptable for such different sizes and types of sight glasses.

The unit which I have developed is composed of relatively few parts, the major number of which are useable on all types or sizes of sight glasses which are now generally in use in those fields in which sight glasses are normally employed.

The illuminator of this invention is relatively inexpensive, is manufactured and sold as a unit, and may be applied to any type or size of sight glass without requiring the exercise of any special mechanical skills.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
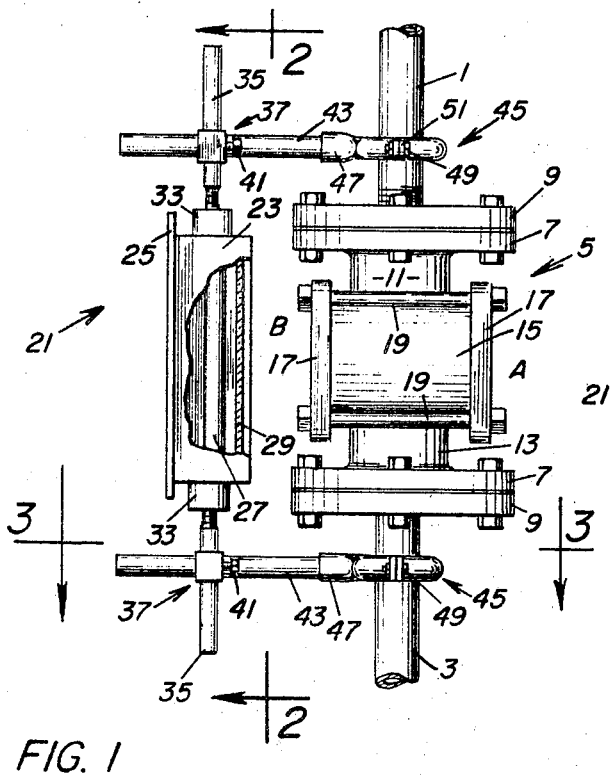
FIG. 1 is a view in elevation of the illuminator assembly in operative mounted position to cast its illuminating light upon the sight glass, parts of the illuminator assembly being broken away.
Figure 2:
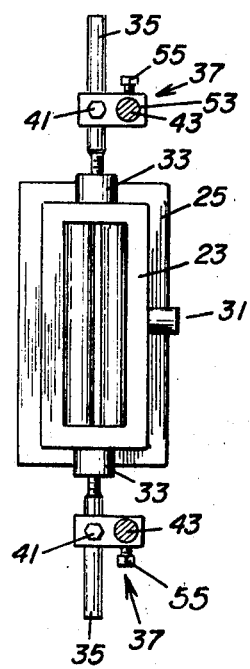
FIG. 2 is a view taken on the line 2—2 of FIG. 1.
Figure 3:
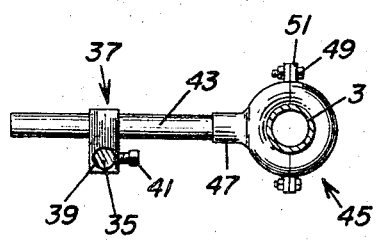
FIG. 3 is a view taken on the line 3—3 of FIG. 1.

In the accompanying drawings I have used the numeral 1 to indicate one section of a fluid flow line and the numeral 3 to indicate another section of this line. Between and in communication with the lines 1 and 3 is a sight glass unit which I have designated in its entirety by the numeral 5. It will be understood that the fluid flows through the sight glass unit. In the drawings I have illustrated one, from among many, type of sight glass unit with which my illuminator may be used, such sight glass unit includes a pair of connecting collars 7 which are connected to similar collars 9 which are secured, in any suitable manner, to the ends of the flow line 1 and 3. In communication with the flow lines 1 and 3 are tubular elements 11 and 13 respectively, to which the collars 7 are connected. The sight glass unit, in this instance, also includes a substantially tubular element 15, the ends of which are enclosed in the usual manner by transparent glass panes (not shown), which are mounted in any suitable mounting means 17 which are connected together by tie rods 19. The flow of fluid may be running in either direction through the lines 1 and 3, the tubular elements 11 and 13 and the transverse tubular element 15 so that the fluid flow may be seen through the sight glass mounted at the end A of the sight glass unit, while, as will be explained, the rays from the illuminator unit will pass through the transparent pane at the end B of the sight glass unit.

It is to be distinctly understood that the sight glass unit 5, illustrated in the drawings, is merely by way of example, and is not to be construed as a limitation, for example, the transverse tubular sight glass holding assembly 15 and 17 may be mounted in alignment with the flow lines 1 and 3 and still fall within the spirit and scope of my invention.

The numeral 21 has been used to designate my illuminator or light source assembly in its entirety, and this assembly includes a light source housing 23 which may, if desired, extend forward from a base or panel 25. Positioned within the housing 23 is any suitable type of light source, which may be a fluorescent tube, or the like, and I may provide any suitable type of lens 29 at the open inner end of the housing. The housing 23 is provided with a tapped connection 31, so that in the installation of the illuminator, or light assembly, the installer may make the electrical connection with the light source 27, either by BX or rigid conduit, or the like. At each end of the housing 23 is provided an internally threaded collar 33 which may be connected to the housing in any suitable and desired manner. I threadedly mounted in each such collar a leg 35 which is of a length so that the length of the housing 23 combined with the lengths of the legs 35 is at least equal to the length of the sight glass unit 5. The reason for this construction will become apparent as this description proceeds.

As part of the components comprising the illuminator assembly mounting and arrangement of this invention I provide a pair of right angle connectors, which I have designated generally by the numeral 37. One of such right angle connectors being adjustably mounted on one leg 35, while the other right angle connector is adjustably mounted on the other leg 35. Such adjustable connection of a right angle connector to each leg 35 being made by passing the leg 35 through the hole 39 which is provided in each right angle connector 37 for adjustably receiving the leg 35. I provide a set screw 41 which extends through the body of each connector 37 and which may be adjusted to secure the connector in the desired position along a leg 35.

Constituting further mounting components of the light source assembly are a pair of arms 43, each of which is provided on one end thereof with a clamping annulus designated in its entirety by the numeral 45. Such clamping annuli are adapted to be clamped about fluid flow lines 1 and 3. Each clamping annulus 45 is provided with a sleeve 47 which threadedly, or otherwise, receives the end of each arm 43. The annuli 45 are of split ring construction, and the two parts thereof are placed about the fluid flow line sections 1 and 3 and clamped together by means of bolts and nuts 49 which extend through flanges 51 which are provided on the two sections of the annuli.

Each of the arms 43 extends through an opening 53 which is provided in each right angle connector 37, and since the arms 43 are slidably received within the openings 53, I provide a set screw locking means 55 for locking the arms 43 in the desired location within the right angle connector.

It will now be recognized that I have provided a mounting means for a sight glass illuminator which is adaptable in a simple, easy and effective manner to sight glass units of varying dimensions with respect to the axis of the fluid flow lines 1 and 3, as well as to sight glass units which are of different radial dimensions relative to the fluid flow line sections 1 and 3. Consideration particularly of FIG. 1 of the drawing indicates that if the sight glass unit 5 was of a greater dimension with respect to the axis of the fluid flow lines 1 and 3, the set screw or locking screw 41 would be loosened to permit the sliding movement of each right angle connector 37 on each leg 35, with the resultant outward movement of arms 43 with respect to the illuminator assembly 21, so that the clamps 45 would be spaced further apart on fluid flow lines 1 and 3, to accommodate sight glass units of greater length than that illustrated. Likewise, if my sight glass illuminator was employed with a type of sight glass unit having a larger dimension radially with respect to fluid flow lines 1 and 3, the set screw 55 would be loosened so that the right angle connector 37 could be moved along the arms 43 away from the sight glass unit.

In the development of this mounting arrangement I have found that if the combined length of the two legs 35 and the illuminator assembly 21 are at least equal to the axial length of the sight glass unit, and the length of the arms 43 are at least equal to the radial width of the sight glass unit, the illuminator may be adapted for use with substantially all types and sizes of sight glass units.

I claim:

1. An illuminator for a sight glass which is positioned in a fluid flow line for flow of fluid therethrough, including a light source assembly, and means for mounting said light source assembly adjacent to said sight glass for directing illuminating rays thereon, said means including a leg fixed to and extending from each end of said light source assembly, connecting means slidably mounted on each leg and locking means for releasably locking each connecting means in predetermined position on each leg, an arm slidably connected to each connecting means and further locking means for locking each arm in predetermined position relative to said connecting means, each of said arms extending radially from each of said legs, and clamping means on one end of each arm adapted to clamp on the fluid flow line at each side of the sight glass.

2. An illuminator for a sight glass which is positioned in a fluid flow line for flow of fluid therethrough, including a light source assembly, and means for mounting said light source assembly adjacent to said sight glass for directing illuminating rays thereon, said means including a leg fixed to and extending from each end of said light source assembly, a pair of arms having clamping means on one end thereof adapted to clamp on the fluid flow line at each side of the sight glass and to extend radially therefrom, means mounted on each of said legs and connected with said arms and operable to determine the distance between the light source assembly and the sight glass and the distance between said arms.

3. An illuminator for a sight glass in accordance with claim 1, wherein said connecting means comprises a right angle connector.

4. An illuminator for a sight glass, including in combination, a light source assembly, a fluid flow line and a sight glass unit positioned in said fluid flow line for flow of fluid therethrough, means for mounting said light source assembly adjacent said sight glass unit for directing illuminating rays thereon, elongated support means extending from each end of said light source assembly and said support means being at least as long as the axial dimension of said sight glass unit with respect to the fluid flow line, a pair of further elongated support means connected to said first mentioned support means and to said fluid flow line, and said further elongated support means being at least as long as the radial dimension of said sight glass unit with respect to said fluid flow line.

5. An illuminator for a sight glass in accordance with claim 4, wherein means is connected to said elongated support means and said further elongated support means for varying the relative positions thereof.

References Cited

UNITED STATES PATENTS

| | | | |
|---|---|---|---|
| 1,542,512 | 6/1925 | Lett | 240—6.44 |
| 2,496,447 | 2/1950 | Dresser | 73—293 |
| 2,585,104 | 2/1952 | Folke | 73—293 |

NORTON ANSHER, *Primary Examiner.*

RICHARD L. MOSES, *Assistant Examiner.*